United States Patent [19]

Lowther

[11] 4,172,988

[45] Oct. 30, 1979

[54] BRUSH WEAR INDICATING MEANS WITH ENGAGEABLE ELECTRICAL CONTACTS

[75] Inventor: Leslie Lowther, Leicester, England

[73] Assignee: Towmotor Corporation, Mentor, Ohio

[21] Appl. No.: 849,160

[22] Filed: Nov. 7, 1977

[30] Foreign Application Priority Data

Aug. 2, 1977 [GB] United Kingdom ............... 32337/77

[51] Int. Cl.2 ............................................. H02K 13/00

[52] U.S. Cl. ...................................... 310/245; 310/242

[58] Field of Search ............... 310/239, 238, 240, 241, 310/242, 245, 246, 248, 249, 73

[56] References Cited

U.S. PATENT DOCUMENTS

| | | | |
|---|---|---|---|
| 2,691,114 | 10/1954 | Lykins | 310/246 |
| 3,112,419 | 11/1963 | Dobslaw | 310/239 |
| 3,339,098 | 8/1967 | Burrows | 310/239 |
| 3,423,618 | 1/1969 | Schmid | 310/246 |
| 3,523,288 | 8/1970 | Thompson | 310/245 |
| 3,590,297 | 6/1971 | Smith | 310/249 |
| 3,898,492 | 8/1975 | Vassos | 310/242 |

*Primary Examiner*—R. Skudy

*Attorney, Agent, or Firm*—Phillips, Moore, Weissenberger, Lempio & Majestic

[57] ABSTRACT

A brush which presses against the commutator of a machine has secured thereto a resilient spring contact element, and as the brush wears, movement thereof causes physical engagement of the resilient spring contact element with another contact element to complete a current path. The latter contact element is secured to a yoke which surrounds the commutator.

6 Claims, 3 Drawing Figures

BRUSH WEAR INDICATING MEANS WITH ENGAGEABLE ELECTRICAL CONTACTS

BACKGROUND OF THE INVENTION

Machines such as motors or generators include a commutator fixed to the rotating armature and electrically connected to the armature windings, the armature being electrically connected to an external power circuit through brushes which engage the rotating commutator. The brushes are usually made up of a mixture of carbon particles and a binder material, such as graphite or a metallic powder. As the commutator rotates, the contact faces of the brushes gradually wear away. In order to maintain electrical contact, the brushes are telescopically mounted in stationary brush holders on a yoke surrounding the commutator, the brushes being urged into engagement with the commutator. Wearing of the brushes causes them to shorten in length and eventually they must be replaced. If a brush is allowed to wear too much before replacement, the termination of the pigtail connection to the brush will engage the commutator and cause detrimental scoring thereof.

SUMMARY OF THE INVENTION

The present invention is directed to overcoming one or more of the problems as set forth above.

The invention comprises an improved brush wear indicator for a machine having a rotating commutator, a yoke surrounding the commutator, a brush holder on the yoke, and a brush reciprocally mounted in the holder. The brush has a contact face urged by biasing means against the commutator. The improved indicator comprises a first electrical contact secured to the brush for reciprocal movement therewith, and a second electrical contact secured to the yoke and positioned to be engaged by the first electrical contact upon wearing of the brush. Upon such engagement, an electrically energized signal means, connected to the second electrical contact, will alert an operator that such wear of the brush has occurred.

BRIEF DESCRIPTION OF THE DRAWINGS

Other objects of the invention will become apparent from a study of the following specification and drawings, in which.

DESCRIPTION OF THE PREFERRED EMBODIMENT

Figure 1:
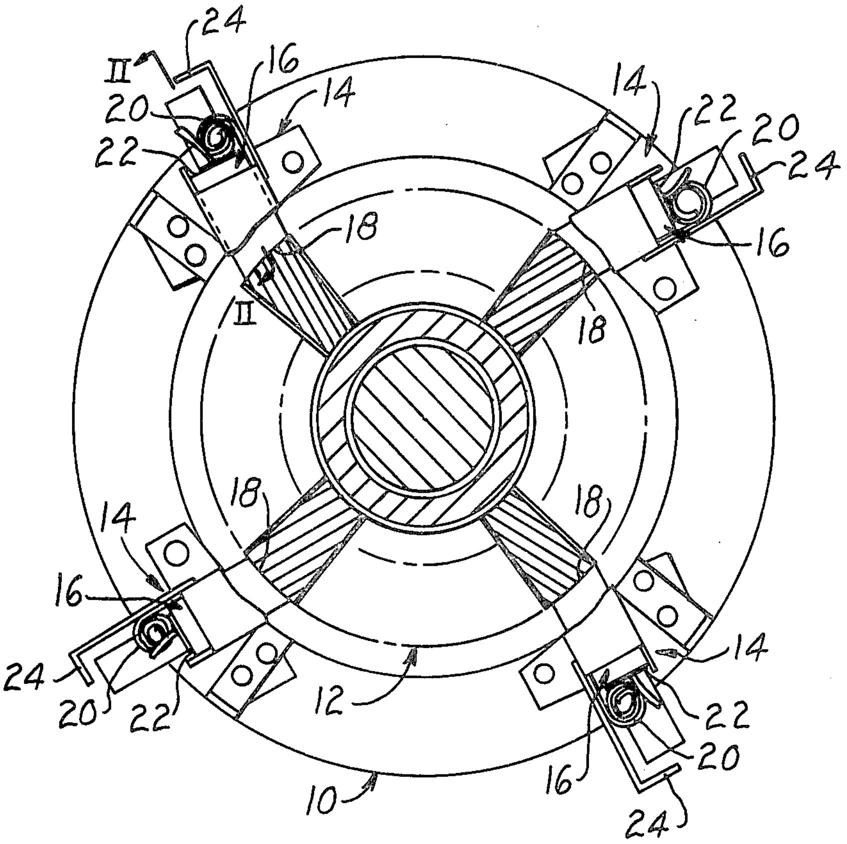
FIG. 1 is a view, partially in section, of a typical commutator and yoke arrangement incorporating the present invention.

Referring to the drawings, a conventional electrically non-conductive yoke 10 surrounds a commutator 12. The commutator 12 is, of course, rotatable, and the yoke 10 has mounted thereto a plurality of brush holders 14, in which are slidably mounted individual carbon brush means 16. The brush means 16 are capable of translatory movement toward and away from the commutator 12 by sliding thereof in the respective brush holders 14, as is well known. Each brush 16 has a contact face 18 in contact with the commutator 12, and a spring 20 bears against the end 22 removed from the contact face 18, inwardly of a leg secured 24 to the holder 14, so that each respective contact face 18 is spring-pressed against the commutator 12.

Each brush 16 has a pair of pigtail leads 26 secured thereto, as for example by insertion of the ends of the pigtail 26 into bores in the brush 16 at the end 22 thereof opposite the contact face 18.

Figure 2:
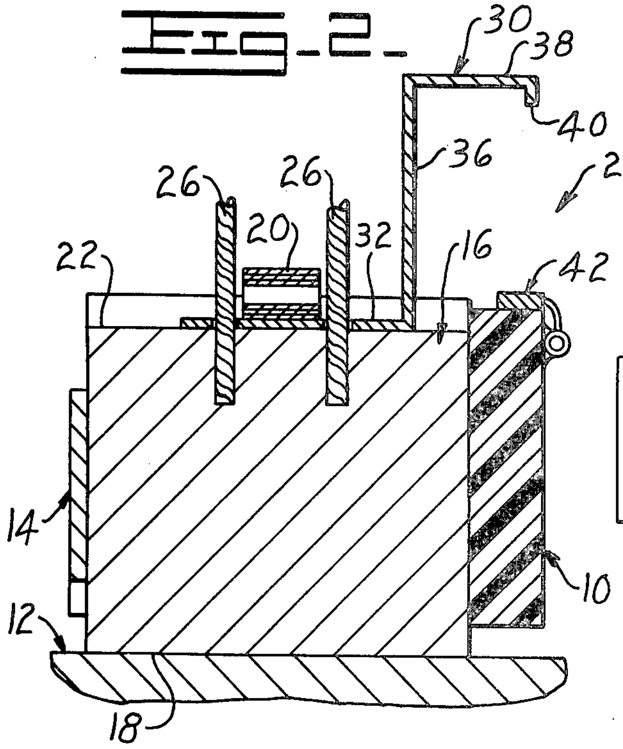
FIG. 2 is a sectional view taken along the line II—II of FIG. 1.
Figure 3:
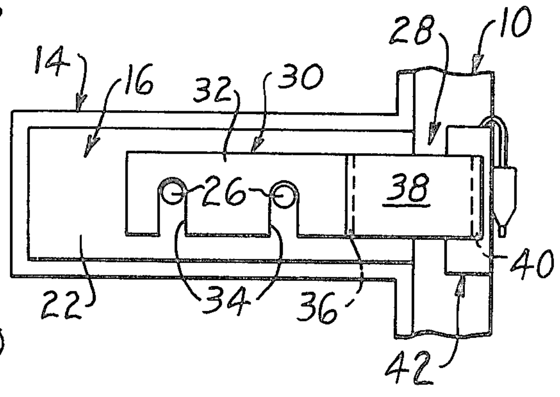
FIG. 3 is a plan view of the apparatus as shown in FIG. 2.

Contact means 28 making up part of the apparatus are shown in FIGS. 2 and 3. As shown therein, such contact means 28 include a first discrete contact element 30 of electrically conductive resilient spring material secured to each brush 16 on the end 22 thereof removed from the contact face 18 thereof. The contact element may be secured to the brush 16 by, for example, bonding, and it will be seen that the spring 20 actually bears against a leg 32 of the contact element 30 which is secured to the brush 16. The leg 32 defines a pair of slots 34 therein through which the pigtail leads 26 pass. A second leg 36 extends from the first leg 32 away from the brush 16, and a third leg 38 extends from the second leg 36, so that the overall contact element 30 is generally Z-shaped in cross-section. A downwardly extending lip 40 extends from the third leg 38 as shown.

It will be seen that the contact element 30 is movable with the brush 16 upon wear thereof.

The yoke 10 has secured thereto second contact element means 42 in the form of a second discrete contact element. The contact element 42 and the contact element 30 are so positioned to provide that the extending end of the leg 38, including the lip 40, overlies a portion of the contact element 42 secured to the yoke 10.

Through the inclusion of well-known electrical circuitry operatively connected with the contact element 42, and also with, for example, signal means such as a light or horn 43, it will be seen that upon sifficient wear of a brush 16, the lip 40 of the contact element 30 is brought into contact with the contact element 42, so that current from the brush passes through the contact element 30, through the contact element 42 to the light or horn to operate it so that the operator of the vehicle is warned of the condition of the brush.

Because the contact element 30 is of resilient spring material, it will be noted that the spring 20 will continue to urge the brush 16 into operating contact with the commutator 12 even after the warning has been signaled to the operator. This will allow the machine to operate, meanwhile allowing sufficient time to effect a brush change.

The embodiments of the invention in which an exclusive property or privilege is claimed are defined as follows:

1. In a machine of the type having a rotating commutator, a yoke surrounding said commutator, at least one holder secured to said yoke, a brush reciprocally mounted in said holder and defining a contact face on a first end thereof, biasing means engaging said brush for urging the contact face of said brush into contact with said commutator, and brush wear indicating means for indicating wearing of said brush, the improvement wherein said brush indicating means comprises a first electrical contact secured to said brush for reciprocal movement therewith, a second electrical contact secured to said yoke and normally disposed in spaced-apart relationship relative to said first electrical contact and engageable with said first electrical contact upon wearing of said brush, and electrically energized signal means connected to said second electrical contact for alerting an operator of wearing of said brush in response to engagement of said first electrical contact with said second electrical contact.

2. The machine of claim 1 wherein said yoke is composed of an electrically non-conductive material.

3. The machine of claim 1 wherein said first electrical contact comprises a metallic element secured to a second end of said brush, opposite to the first end thereof whereat said contact face is defined.

4. The machine of claim 3 wherein said element comprises first leg secured to the second end of said brush, a second leg secured to said first leg and extending away therefrom and a third leg secured to said second leg and disposed in spaced-apart relationship relative to said first leg.

5. The machine of claim 4 wherein said first electrical contact further comprises a lip secured on an end of said third leg, said lip overlying said second electrical contact.

6. The machine of claim 4 wherein a slot is formed through the first leg of said first electrical contact and further comprising an electrical lead secured to the second end of said brush and extending through said slot.

* * * * *